3,155,580
ANTIBIOTIC COMPOSITION

Malcolm E. Bergy and Ross R. Herr, Kalamazoo, and Donald Joseph Mason, Portage Township, Kalamazoo County, Mich., assignors to The Upjohn Company, Kalamazoo, Mich., a corporation of Delaware
No Drawing. Filed Aug. 30, 1961, Ser. No. 134,843
6 Claims. (Cl. 167—65)

This invention relates to novel compositions and more particularly to compositions having lincolnensin as an essential active ingredient in association with a pharmaceutical carrier, said compositions being useful for the therapeutic treatment of humans and animals hosting bacterial infestations.

The compositions of the present invention are useful in the treatment of humans and animals for various pathological conditions. The compositions provide a means for administering the therapeutic ingredient by the oral and parenteral routes for systemic treatment as well as topical and localized treatment. The compositions provide a method of therapy for tonsillitis, pneumonia, otitis, conjunctivitis, boils, carbuncles and other infectious conditions of humans due to the presence of baceteria such as those shown in Table I. In animals the compositions can be used prophylactically. For example, rats can be protected from *Streptococcus viridans* during shipment. Animals raised for meat can be given prophylactic treatment for increased weight gains. Further, chickens infected with PPLO (pleuropneumonialike organisms) can be treated.

The novel compositions of the present invention comprise lincolnensin as the principal active ingredient in combination with a pharmaceutical carrier or diluent.

Lincolnensin is a bio-synthetic product obtainable by the controlled fermentation of *Streptomyces lincolnensis* var. *lincolnensis*, and has the property of adversely affecting the growth of various organisms, particularly gram positive bacteria. It is a basic compound capable of forming acid addition salts and is useful in both the free base and acid addition salt forms. The compound lincolnensin is also known as lincomycin. The salts are also named as derivatives of the base; e.g., lincomycin hydrochloride, lincomycin sulfate, and the like.

A strain of *Streptomyces lincolnensis* var. *lincolnensis* particularly effective for producing lincolnensin can be obtained from the permanent collection of the Fermentation Division, Northern Utilization Research Branch, U.S. Department of Agriculture, Peoria, Illinois, where it has been deposited as *Streptomyces lincolnensis* var. *lincolnensis* NRRL 2936.

Lincolnensin is a basic nitrogenous compound having a pKa of 7.6 and under ordinary conditions is more stable in the protonated, that is, salt form. It is soluble in lower-alkanols, e.g., methanol, ethanol, butanol, isopropanol, and the like; lower-alkyl esters of lower-alkanoic acids, e.g., ethyl acetate, n-butyl acetate, amyl acetate, and the like; lower-alkanones, e.g., acetone, methyl ethyl ketone, isopropyl n-butyl ketone, and the like; and chlorinated lower-alkanes, e.g., methylene chloride, chloroform, ethylene dichloride, and the like. It has some solubility in water but can be extracted from aqueous solutions with water-immiscible solvents, e.g., n-butanol, n-butyl acetate, methyl ethyl ketone, methylene chloride and the like.

The antibiotic free base can be protonated with an acid to form a crystalline salt. The salt formed will depend upon the specific acid used, e.g., if sulfuric acid is used, the crystalline salt is lincolnensin sulfate. Specific acid salts can be made by neutralizing the free base with the appropriate acid to below about pH 7.6 and advantageously to about pH 2 to 6. Suitable acids for this purpose include hydrochloric, sulfuric, phosphoric, nitric, acetic, citric, tartaric, succinic, lactic, maleic, fumaric, methanesulfonic, benzenesulfonic, helianthic, Reinecke's, azobenzenesulfonic, picric, and like acids.

The salts can be converted to the free base by neutralizing with an alkali or by contacting with an anionic resin to raise the pH above about 7.6, the pKa of the free base, and advantageously to about pH 9 to 11.

TABLE I

Lincolnensin (as the hydrochloride having an optical rotation $[\alpha]_D$ +122 [water], an equivalent weight of 455) has the following in vivo effectiveness in mice.

| Organism | $CD_{50}$ (mg./kg.) Subcutaneously | $CD_{50}$ (mg./kg.) Oral |
|---|---|---|
| Streptococcus hemolyticus | 0.81 | 3.8 |
| Diplococcus pneumonia | 20 | 145 |
| Staphylococcus aureus | 7.1 | 16 |

The $CD_{50}$ is the dose effective to give 50% survival. The preparation has the following in vitro spectrum.

| Test Organisms | MIC (p/Ml.)[1] | |
|---|---|---|
| | BHI | PVE |
| Diplococcus pneumoniae | 0.4 | NG |
| Escherichia coli | >100 | >100 |
| Klebsiella pneumoniae | >100 | 50 |
| Pasteurella multocida | 0.4 | 0.1 |
| Proteus vulgaris | >100 | >100 |
| Pseudomonas aeruginosa | >100 | >100 |
| Salmonella paratyphi | >100 | >100 |
| Salmonella pullorum | 100 | >100 |
| Salmonella typhi | >100 | >100 |
| Staphylococcus aureus | 0.2 | 0.8 |
| Staphylococcus albus | 0.1 | 0.4 |
| Streptococcus fecalis | 0.8 | 0.8 |
| Streptococcus hemolyticus | 0.4 | 0.4 |
| Bacillus subtilis | 25 | 50 |

[1] Minimum inhibitory concentration by two-fold dilutions in brain-heart infusion broth (BHI) and peptone-yeast extraction broth. End point at 20 hrs., 37° C. NG=no growth of the control.

The following illustrate the preparation of the active ingredient of the compositions of the present invention. All percentages are by weight and all solvent mixture proportions are by volume unless otherwise noted.

PREPARATION I

*Part A—Seed*

A soil slant of *Streptomyces lincolnensis* var. *lincolnensis* NRRL 2936 was used to inoculate a series of 500 ml. Erlenmeyer flasks each containing 100 ml. of seed medium consisting of the following ingredients:

| | Grams |
|---|---|
| Yeastolac [1] | 10 |
| Glucose monohydrate | 10 |
| N-Z-Amine B [1] | 5 |
| Tap water, q.s. 1 liter. | |

[1] Yeastolac is a protein hydrolysate of yeast cells and N-Z-Amine B is Sheffield's enzymatic digest of casein.

The seed medium presterilization pH was 7.3. The seed was grown for two days at 28° C. on a Gump rotary shaker operating at 250 r.p.m.

Part B—Fermentation

Two 250-liter fermentations were conducted in the following manner.

a. *Seed medium.*—A 40 liter fermentor containing 20 liters of the following sterile medium (pH 7.2):

| | G./liter |
|---|---|
| Glucose monohydrate | 10 |
| Wilson's peptone liquor No. 159 | 10 |
| Corn steep liquor | 10 | 
| Pharmamedia [1] | 2 |
| Lard oil | 2 |
| Tap water, balance. | |

[1] Pharmamedia is an industrial grade of cottonseed flour produced by Traders Oil Mill Co., Fort Worth, Texas.

was inoculated with 100 ml. of a preseed medium, prepared according to Example 1, Part A, and grown at 28° C. for two days while agitating with a stirrer at 400 r.p.m. and aerating at the rate of ten standard liters of air per minute.

b. *Fermentation.*—Each of two 380-liter fermentors containing 250 liters of the following sterile medium (pH 6.45):

| | G./liter |
|---|---|
| Starch [1] | 20 |
| Black strap molasses | 20 |
| Corn steep liquor | 20 |
| Wilson's peptone liquor No. 159 | 10 |
| Calcium carbonate | 4 |
| Lard oil | 5 |
| Tap water, balance. | |

[1] Glucose monohydrate can be used to replace all or part of the starch.

was inoculated with 12 liters of the seed medium and fermented at 28° C. for 5 days while agitating at 280 r.p.m. and aerating at the rate of 100 standard liters of air per minute. In one fermentor 700 ml. of sterile lard oil was added during the fermentation to control foaming and in the second, 900 ml. of sterile lard oil was added. At the end of the fermentation (114 hrs.), 250 liters of beer was harvested from the first fermentor (pH 7.9; assay, 24 biounits/ml.) and 210 liters from the second fermentor (pH 7.9; assay, 43 biounits/ml.)

Part C—Extraction

The whole beer from the first fermentor was adjusted from a harvest pH 7.9 to pH 6.7 with 70 ml. of concentrated sulfuric acid and filtered using 4% filter aid. The filter cake was washed with 1/10 volume of water, based on the whole beer, and added to the clear beer. The clear beer (250 liters; assay, 20 biounits/ml.) was adjusted to pH 10 with 300 ml. of 50% aqueous sodium hydroxide solution, and extracted two times with 1/3 volume of 1-butanol. The combined 1-butanol extracts (160 liters; assay 23 biounits/ml.) were mixed with ½ volume of water (80 liters) and adjusted to pH 2 with 50 ml. of concentrated sulfuric acid. The aqueous extract (110 liters; assay, 36 biounits/ml.) was separated off, adjusted to pH 10.1 with 120 mls. of 50% aqueous sodium hydroxide solution and extracted two times with 1/3 volume of 1-butanol. The combined butanol extracts (80 liters; assay, 48 biounits/ml.) was washed with 1/10 volume of water. The washed butanol extract freeze-dried to give about 21 g. of dried preparation (DEG 54–11), assaying 145 biounits/mg.

The procedure above was repeated on the whole beer of the second fermentation to give 105 g. of dried preparation (HRV 134–11) assaying 125 biounits/mg.

Part D—Purification

Preparation DEG 54–11 and 24.31 g. of preparation HRV 134–11 were combined (combined weight, 45.58 g.; assay, 177 biounits/mg.) and dissolved in 252 ml. of water. The solution was adjusted to pH 2.0 with concentrated sulfuric acid and a brown precipitate was removed by filtration. The filtrate was extracted once with 250 ml. of methylene chloride to remove impurities. The aqueous layer (raffinate) was adjusted to pH 5.0 with 50% aqueous sodium hydroxide and extracted once with 250 ml. of methylene chloride. The methylene chloride extracts removed 3.6 grams of impurities at a potency of 12 biounits/ml.

The aqueous raffinate was adjusted to pH 10.2 with 50% aqueous sodium hydroxide and extracted 5 times with 250 ml. portions of methylene chloride. One hundred ml. of water was added to the combined extracts and the methylene chloride removed in vacuo. The resulting aqueous solution was freeze dried to give 32 grams of dry preparation (MEB 2) assaying 232 biounits/mg.

Part E—Crystallization

Further purification of preparation MEB 2 was accomplished by use of a partition column. The column was prepared and developed as follows: A solvent system consisting of cyclohexane, methyl ethyl ketone, and pH 10 buffer (70:30:20 by volume) was thoroughly mixed and equilibrated. (The pH 10.0 buffer was made by adding sufficient $NaHCO_3$ to a 0.2 M $Na_2CO_3$ solution to adjust the pH to pH 10.0.) One hundred grams of diatomite was slurried in upper phase of the system described above; forty ml. of lower phase was added and the whole slurry homogenized. This solvent-diatomite mixture was poured into a glass column (1¼" inside diameter) and packed to a constant height using 2 p.s.i. gauge of air pressure. The feed for the column, 2.5 g. of preparation MEB 2, was dissolved in 2 ml. of lower phase and then homogenized with upper phase and placed onto the top of the column bed. The column was developed with upper phase at a rate of approximately 2 ml./minute. Two hundred 20-ml. fractions were collected. Fractions 1 through 85 were inactive; fractions 90 through 200 all possessed about the same activity.

Fractions 100 through 200 were pooled and concentrated in vacuo (less than 50° C.) to dryness. The residue was dissolved in 20 ml. of water and the pH was adjusted to pH 2.0 using concentrated hydrochloric acid. The aqueous solution was extracted 2 times with 10 ml. of 1-butanol and the aqueous raffinate was distilled in vacuo at less than 50° C. to 10 ml. to remove dissolved 1-butanol. Acetone (50–60 ml.) was added slowly to the aqueous concentrate and crystallization started. The aqueous acetone solution stood for 30 minutes at room temperature. The crystals were filtered off and vacuum dried to a constant weight. There was thus obtained 388 mg. of lincolnensin hydrochloride crystals (MEB 12) assaying 150 biounits/mg., having a melting point of 145–147° C., an optical rotation $[\alpha]_D +133$ (water), no ultraviolet arbsorption (220 to 400 millimicrons), and the following characteristic IR absorption.

| Group | Bands, cm.$^{-1}$ |
|---|---|
| OH/NH | 3500 (shoulder, 3400, 3340, 3240, 3150, 3060. 6µ region 1690, 1675, 1600, 1590. Other bands: 1315, 1305, 1276, 1265, 1233, 1155, 1140, 1115, 1100, 1093, 1078, 1042, 990, 985, 970, 875, 793. |

PREPARATION 2

A. The procedure of Preparation 1, Part B, was repeated and the two fermentations were combined to give 490 liters of whole beer assaying 11.2 biounits/ml. This beer was extracted by the procedure of Preparation 1, Part C, to give 62.3 g. of a solid preparation (EAK 137–11) assaying 70 biounits/mg. The fermentation of Preparation 1, Part B, was scaled up to a 2000 gallon fermentor to give 4900 liters of whole beer assaying 22 biounits/ml. which on extraction by the same procedure, except that the final butanol extract was not evaporated to dryness, gave 40 liters of aqueous solution (WTP 123–11) assaying 1000 biounits/ml.

B. Preparation EAK 137–11 was added to aqueous solution WTP 123–18 and the resulting 40 liters of solution was concentrated to 4 liters. This aqueous concentrate was adjusted from pH 8.0 to pH 2.0 with 40 ml. of concentrated sulfuric acid, and the resulting brown insoluble material was filtered off. The clear filtrate (pH 2.0) was extracted with 5.0 liters of methylene chloride. The raffinate was adjusted to pH 5.0 with 13 ml. of 50% aqueous sodium hydroxide and extracted again with 5 liters of methylene chloride. The raffinate was readjusted to pH 10.0 with 13 ml. of 50% aqueous sodium hydroxide and extracted 5 times with about 5 liters of methylene chloride for each extraction. The last five methylene chloride extracts were pooled and concentrated in vacuo to a volume of 700 ml., at which times 1.1 liters of deionized water was added. Concentration was continued until approximateoly 1500 ml. of aqueous solution of lincolnensin free base remains.

PREPARATION 3

An aqueous solution of lincolnensin free base is prepared according to Preparation 2. The aqueous solution is adjusted to pH 2.2 by the addition of sulfuric acid and extracted twice with ½ volume of 1-butanol. The raffinate is concentrated to a volume of 1.1 liters and 15 liters of acetone added to promote crystallization. The aqueous acetone solution is held 12 hours at 0° C. The crystals are filtered off, washed with a small volume of acetone and dried in vacuo at room temperature to yield crystalline lincolnensin sulfate.

PREPARATION 4

An aqueous solution of lincolnensin free base is prepared according to Preparation 2. The aqueous solution is adjusted to pH 2.2 by the addition of acetic acid and extracted twice with ½ volume of 1-butanol. The raffinate is concentrated to a volume of 1.1 liters and 15 liters of acetone added to promote crystallization. The aqueous acetone solution is held 12 hours at 0° C. The crystals are filtered off, washed with a small volume of acetone and dried in vacuo at room temperature to yield crystalline lincolnensin acetate.

PREPARATION 5

An aqueous solution of lincolnensin free base is prepared according to Preparation 2. The aqueous solution is adjusted to pH 2.2 by the addition of phosphoric acid and extracted twice with ½ volume of 1-butanol. The raffinate is concentrated to a volume of 1.1 liters and 15 liters of acetone added to promote crystallization. The aqueous acetone solution is held 12 hours at 0° C. The crystals are filtered off, washed with a small volume of acetone and dried in vacuo at room temperature to yield crystalline lincolnensin phosphate.

The compositions of the present invention are preferably presented for administration to humans and animals in unit dosage forms, such as tablets, capsules, pills, powders, granules, sterile parenteral solutions or suspensions, and oral solutions or suspensions, and oil-water emulsions containing suitable quantities of lincolnensin or its pharmacologically acceptable salts.

For oral administration either solid or fluid unit dosage forms can be prepared. For preparing solid compositions such as tablets, the principal active ingredient is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. The tablets can be laminated or otherwise compounded to provide a dosage form affording the advantage of prolonged or delayed action or predetermined successive action of the enclosed medication. For example, the tablet can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, cetyl alcohol, cellulose acetate phthalate, styrene maleic acid copolymer and the like. Alternatively, the two component system can be utilized for preparing tablets containing two or more incompatible active ingredients. Wafers are prepared in the same manner as tablets, differing only in shape and the inclusion of sucrose or other sweetener and flavor. In their simplest embodiment, capsules, like tablets, are prepared by mixing the antibiotic with an inert pharmaceutical diluent and filling the mixture into a hard gelatin capsule of appropriate size. In another embodiment, capsules are prepared by filling hard gelatin capsules with polymeric acid coated beads containing the antibiotic. Soft gelatin capsules are prepared by machine encapsulation of a slurry of the antibiotic with an acceptable vegetable oil, light liquid petrolatum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydro-alcoholic (ethanol) vehicle with suitable sweeteners such as sugar, saccharin, and cyclamate together with an aromatic flavoring agent. Suspensions can be prepared of the insoluble forms with a syrup vehicle with the aid of a suspending agent such as acacia, tragacanth, methylcellulose and the like.

Topical ointments can be prepared by dispersing the antibiotic in a suitable ointment base such as petrolatum, lanolin, polyethylene glycols, mixtures thereof, and the like. Advantageously, the antibiotic is finely divided by means of a colloid mill utilizing light liquid petrolatum as a levigating agent prior to dispersing in the ointment base. Topical creams and lotions are prepared by dispersing the antibiotic in the oil phase prior to the emulsification of the oil phase in water.

For parenteral administration, fluid unit dosage forms are prepared utilizing the antibiotic and a sterile vehicle, water being preferred. The antibiotic, depending on the form and concentration used, can be either suspended or dissolved in the vehicle. In preparing solutions the water-soluble antibiotic can be dissolved in water for injection and filter sterilized before filling into a suitable vial or ampule and sealing. Advantageously adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the powder prior to use. Parenteral suspensions are prepared in substantially the same manner except that the antibiotic is suspended in the vehicle instead of being dissolved and sterilization cannot be accomplished by filtration. The antibiotic can be sterilized by exposure to ethylene oxide before suspending in the sterile vehicle. Advantageously, a surfactant or wetting agent is included in the composition to facilitate uniform distribution of the antibiotic.

The term unit dosage form as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable unit dosage forms in accord with this invention are tablets, capsules, pills, troches, suppositories, powder packets, granules, wafers, cachets, teaspoonfuls, tablespoonfuls, dropperfuls, ampules, vials, segregated multiples of any of the foregoing, and other forms as herein described.

In addition to the administration of lincolnensin as the principal active ingredient of compositions for the treatment of the conditions described herein, the said lincolnensin can be included with other types of compounds to obtain advantageous combinations of properties. Such combinations include lincolnensin with antibiotics such as actinospectacin, chloramphenicol, tetracyclines (e.g., tetracycline, oxytetracycline and chlortetracycline), penicillin, erythromycin, novobiocin, kanamycin, streptomycin, neomycin, polymyxin, bacitracin, nystatin, fiilipin, fumagillin and endomycin to broaden the bacterial spectrum of the composition and for synergistic action against particular bacteria; steroid having anti-inflammatory activity such as hydrocortisone, prednisolone, 6α-methylprednisolone, 6α-fluoroprednisolone and the like; analgesics such as aspirin, sodium salicylate, (acetylsalicylic acid)-anhydride, N-acetyl-p-aminophenol and salicylamide; antihistamines; such as chlorpheniramine maleate, diphenhydramine, promethazine, pyrathiazine, and the like; sulfas, such as sulfadiazine, sulfamethazine, sulfamerazine, sulfacetamide, sulfadimethyloxazole, sulfamethizole, and the like; antifungals, such as undecylenic acid, sodium propionate, salicylanilide, sodium caprylate, and hexetidine; and the vitamins.

The dosage of lincolnensin for treatment depends on route of administration; the age, weight, and condition of the patient; and the particular disease to be treated. A dosage schedule of from about 50 to 500 mg., 1 to 4 times daily (every six hours), embraces the effective range for the treatment of most conditions for which the compositions are effective. For children the dosage is calculated on the basis of 6 to 8 mg./kg. by weight to be administered every six hours.

The lincolnensin is compounded with a suitable pharmaceutical carrier in unit dosage form for convenient and effective administration. In the preferred embodiments of this invention, the dosage units contain lincolnensin in: 50, 100, 200 and 500 mg. amounts for systemic treatment; in 0.25, 0.5, 1, 2 and 5% amounts for topical or localized treatment; and 0.5 to 25% w./v. for parenteral treatment. The dosage of compositions containing lincolnensin and one or more other active ingredients is to be determined with reference to the usual dosage of each such ingredient.

The following examples are illustrative of the best mode contemplated by the inventors for carrying out their invention and are not to be construed as limiting.

EXAMPLE 1

*Capsules*

One thousand two-piece hard gelation capsules for oral use, each containing 200 mg. of lincolnensin hydrochloride are prepared from the following types and amounts of materials:

| | Gm. |
|---|---|
| Lincolnensin hydrochloride | 200 |
| Corn starch | 150 |
| Talc | 75 |
| Magnesium stearate | 25 |

The materials are thoroughly mixed and then encapsulated in the usual manner.

The foregoing capsules are useful for the systemic treatment of infection in adult humans by the oral administration of 1 capsule every 4 hours.

Using the procedure above, capsules are similarly prepared containing lincolnensin hydrochloride in 50, 100, and 500 mg. amounts by substituting 50, 100 and 500 gm. of lincolnensin hydrochloride for the 200 gm. used above.

EXAMPLE 2

*Capsules*

One thousand two-piece hard gelatin capsules for oral use, each containing 200 mg. of lincolnensin hydrochloride and 250 mg. of tetracycline hydrochloride, are prepared from the following types and amounts of ingredients:

| | Gm. |
|---|---|
| Lincolnensin hydrochloride | 200 |
| Tetracycline hydrochloride | 250 |
| Talc | 75 |
| Magnesium stearate | 25 |

The ingredients are thoroughly mixed and then encapsulated in the usual manner.

The foregoing capsules are useful for the systemic treatment of infection in adult humans by the oral administration of 1 capsule every 6 hours.

Using the procedure above, capsules are similarly prepared containing lincolnensin and each of the following antibiotics in place of tetracycline by substituting 250 gm. of such other antibiotic for tetracycline: chloramphenicol, oxytetracycline, chlortetracycline, fumagillin, erythromycin, streptomycin, dihydrostreptomycin and novobiocin. When a penicillin, such as potassium penicillin G, is to be used in place of tetracycline, 250,000 units per capsule is employed.

Such combination products are useful for the systemic treatment of mixed infections in adult humans by the oral administration of 1 capsule every 6 hours.

EXAMPLE 3

*Tablets*

One thousand tablets for oral use, each containing 500 mg. of lincolnensin hydrochloride are prepared from the following types and amounts of materials:

| | Gm. |
|---|---|
| Lincolnensin hydrochloride | 500 |
| Lactose | 125 |
| Corn starch | 65 |
| Magnesium stearate | 25 |
| Light liquid petrolatum | 3 |

The ingredients are thoroughly mixed and slugged. The slugs are broken down by forcing through a number sixteen screen. The resulting granules are then compressed into tablets, each tablet containing 500 mg. of lincolnensin hydrochloride.

The foregoing tablets are useful for systemic treatment of infections in adult humans by oral administration of 1 tablet every 4 hours.

Using the above procedure, except for reducing the amount of lincolnensin hydrochloride to 200 gm., tablets containing 200 mg. of lincolnensin hydrochloride are prepared.

EXAMPLE 4

*Tablets*

One thousand oral tablets, each containing 200 mg. of lincolnensin hydrochloride and a total of 250 mg. (83.3 mg. each) of sulfadiazine, sulfamerazine, and sulfamethazine, are prepared from the following types and amounts of materials:

| | Gm. |
|---|---|
| Lincolnensin hydrochloride | 200 |
| Sulfadiazine | 83.3 |
| Sulfamerazine | 83.3 |
| Sulfamethazine | 83.3 |
| Lactose | 50 |
| Corn starch | 50 |
| Calcium stearate | 25 |
| Light liquid petrolatum | 5 |

The ingredients are thoroughly mixed and slugged. The slugs are broken down by forcing through a number sixteen screen. The resulting granules are then compressed into tablets, each containing 200 mg. of lincolnensin hydrochloride and a total of 250 mg. (83.3 mg. each) of sulfadiazine, sulfamerazine, and sulfamethazine.

The foregoing tablets are useful for systemic treatment of infections by the oral administration of 4 tablets first and then 1 every six hours.

For the treatment of urinary infections, the triple sulfas in the above formulation is advantageously replaced by 250 gm. of sulfamethylthiadiazole or 250 gm. of sulfacetamide.

EXAMPLE 5

*Granules*

2367 gm. of a granulation suitable for reconstitution with water prior to use is prepared from the following types and amounts of ingredients:

| | Gm. |
|---|---|
| Lincolnensin hydrochloride | 150 |
| Tetracycline hydrochloride | 150 |
| Lecithin | 5 |
| Sucrose, powdered | 2000 |
| Flavor | 60 |
| Sodium metabisulfite | 2 |

The tetracycline is finely divided and coated with the lecithin. The coated tetracycline, lincolnensin, sugar, flavor, and sodium metabisulfite are mixed together until thoroughly blended. The powder mixture is wetted with water and forced through a screen to form granules. The granules are dried and 23.67 gm. filled into 60 cc. bottles. Prior to use sufficient water is added to the granules to make 60 cc. of composition.

The foregoing composition is useful for systemic treatment of infection, particularly in children at a dose of one teaspoonful 4 times daily.

EXAMPLE 6

*Oral Syrup*

One thousand cc. of an aqueous suspension for oral use, containing in each 5 cc. dose, one-half gram of total sulfas and 200 mg. of lincolnensin hydrochloride, is prepared from the following types and amounts of ingredients:

| | |
|---|---|
| Lincolnensin hydrochloride | gm 40 |
| Sulfadiazine | gm 33.3 |
| Sulfamerazine | gm 33.3 |
| Sulfamethazine | gm 33.3 |
| Citric acid | gm 2 |
| Benzoic acid | gm 1 |
| Sucrose | gm 700 |
| Tragacanth | gm 5 |
| Lemon oil | cc 2 |
| Deionized water, q.s. 1000 cc. | |

The citric acid, benzoic acid, sucrose, tragacanth, and lemon oil are dispersed in sufficient water to make 850 cc. of solution. The lincolnensin sulfate and finely powdered sulfas are stirred into the syrup until uniformly distributed. Sufficient water is added to make 1000 cc.

The composition so prepared is useful in the systemic treatment of pneumonia in adult humans at a dose of 1 teaspoonful 4 times a day.

EXAMPLE 7

*Parenteral Solution*

A sterile aqueous solution for intramuscular use, containing in 1 cc. 200 mg. of lincolnensin hydrochloride is prepared from the following types and amounts of materials:

| | Gm. |
|---|---|
| Lincolnensin hydrochloride | 200 |
| Lidocaine hydrochloride | 4 |
| Methylparaben | 2.5 |
| Propylparaben | 0.17 |
| Water for injection, q.s. 1000 cc. | |

The ingredients are dissolved in the water and the solution sterilized by filtration. The sterile solution is filled into vials and the vials sealed.

EXAMPLE 8

*Parenteral Solution*

A sterile aqueous solution for intramuscular use, containing in 1 cc. 50 mg. of lincolnensin hydrochloride, is prepared from the following types and amounts of ingredients:

| | Gm. |
|---|---|
| Lincolnensin hydrochloride | 50 |
| Lactose | 50 |
| Water for injection, q.s. 1000 cc. | |

The lincolnensin salt and lactose are dissolved in the water and the solution sterilized by filtration. The sterile solution, in the amount of 2 cc., is aseptically filled into sterile vials and frozen. The water is removed under high vacuum and the vials containing the lyophilized powder are sealed. Just prior to use, sufficient sterile water for injection to make 2 cc. of solution is added to the vial.

EXAMPLE 9

*Topical Ointment*

One thousand gm. of 0.25% ointment is prepared from the following types and amounts of ingredients:

| | Gm. |
|---|---|
| Lincolnensin hydrochloride | 2.5 |
| Zinc oxide | 50 |
| Calamine | 50 |
| Liquid petrolatum (heavy) | 250 |
| Wool fat | 200 |
| White petrolatum, q.s. | 1000 |

The white petrolatum and wool fat are melted and 100 gm. of liquid petrolatum added thereto. The lincolnensin, zinc oxide and calamine are added to the remaining liquid petrolatum and the mixture milled until the powders are finely divided and uniformly dispersed. The powder mixture is stirred into the white petrolatum mixture and stirring continued until the ointment congeals.

The foregoing ointment is usefully applied topically to the skin of mammals for the treatment of infection.

The foregoing composition can be prepared by omitting the zinc oxide and calamine.

Following the procedure above, ointments are similarly prepared containing lincolnensin in 0.5, 1, 2 and 5% amounts by substituting 5, 10, 20 and 50 gm. of lincolnensin for the 2.5 gm. used above.

EXAMPLE 10

Cream

One thousand gm. of a vaginal cream are prepared from the following types and amounts of ingredients:

| | Gm. |
|---|---|
| Lincolnensin hydrochloride | 50 |
| Tegacid Regular [1] | 150 |
| Spermaceti | 100 |
| Propylene glycol | 50 |
| Polysorbate 80 | 5 |
| Methylparaben | 1 |
| Deionized water, q.s. | 1000 |

[1] Self-emulsifying glyceryl monostearate from Goldschmidt Chemical Corporation, New York, N.Y.

The Tegacid and spermaceti are melted together at a temperature of 70–80° C. The methylparaben is dissolved in about 500 gm. of water and the propylene glycol, Polysorbate 80, and lincolnensin are added in turn, maintaining a temperature of 75–80° C. The methylparaben mixture is added slowly to the Tegacid and spermaceti melt, with constant stirring. The addition is continued for at least 30 minutes with continued stirring until the temperature has dropped to 40–45° C. The pH of the final cream is adjusted to 3.5 by incorporating 2.5 gm. of citric acid and 0.2 gm. of dibasic sodium phosphate dissolved in about 50 gm. of water. Finally, sufficient water is added to bring the final weight to 1000 gm. and the preparation stirred to maintain homogeneity until cooled and congealed.

The foregoing composition is useful for the treatment of vaginal infections in humans.

EXAMPLE 11

Ointment, Ophthalmic

One thousand gm. of an ophthalmic ointment containing 0.5% lincolnensin hydrochloride are prepared from the following types and amounts of ingredients:

| | Gm. |
|---|---|
| Lincolnensin hydrochloride | 5 |
| Bacitracin | 12.2 |
| Polymyxin B sulfate (10,000 units/mg.) | 1 |
| Light liquid petrolatum | 250 |
| Wool fat | 200 |
| White petrolatum, q.s. | 1000 |

The antibiotics are finely divided by means of an air micronizer and added to the light liquid petrolatum. The mixture is passed through a colloid mill to uniformly distribute the antibiotics. The wool fat and white petrolatum are melted together, strained, and the temperature adjusted to 45–50° C. The liquid petrolatum slurry is added and the ointment stirred until congealed. Suitably the ointment is packaged in one dram ophthalmic tubes.

The foregoing ointment is usefully applied to the eye for treatment of localized infection in humans and other animals.

Advantageously the foregoing composition can contain 5 gm. (0.5%) of methylprednisolone for the treatment of inflammation, and, alternatively, the bacitracin and polymyxin B sulfate can be omitted.

EXAMPLE 12

Eye-Ear Drops

One thousand cc. of a sterile aqueous solution for eye or ear use containing 10 mg. of lincolnensin (free base) and 10 mg. of prednisolone in each cc. is prepared from the following types and amounts of ingredients:

| | Gm. |
|---|---|
| Lincolnensin | 10 |
| Prednisolone succinate sodium | 10 |
| Sodium citrate | 4.5 |
| Polyethylene glycol 4000 | 120 |
| Myristyl-$\gamma$-picolinium chloride | 0.2 |
| Polyvinylpyrrolidone | 1 |
| Deionized water, q.s. ad 1000 cc. | |

The ingredients are dissolved in the water and the resulting solution is sterilized by filtration. The solution is aseptically filled into sterile dropper containers.

The composition so prepared is useful in the topical treatment of inflammation and infection of the eye and ear as well as other sensitive tissues of the animal body.

EXAMPLE 13

Troches

Ten thousand troches are prepared from the following types and amounts of ingredients:

| | Gm. |
|---|---|
| Lincolnensin hydrochloride | 100 |
| Neomycin sulfate | 50 |
| Polymyxin B sulfate (10,000 units/mg.) | 1 |
| Ethyl aminobenzoate | 50 |
| Calcium stearate | 150 |
| Powdered sucrose, q.s. | 5000 |

The powdered materials are mixed thoroughly and then compressed into half gram troches following the usual techniques for the preparation of compressed tablets.

The troches are held in the mouth and allowed to dissolve slowly to provide treatment for the mouth and throat of humans.

EXAMPLE 14

Chewing Gum

Pieces of uncoated chicle chewing gum of tablet-like shape weighing about one gram each are used as starters for the coating process. A coating of sucrose is first applied, using a syrup (80% sucrose solution) and the usual coating pan. A finely powdered highly hydrogenated castor oil, such as Thixcin, is dusted on the sucrose-covered starters. The second coating step is the application of a dispersion of lincolnensin hydrochloride and benzocaine (10:1) in absolute ethanol. Successive applications are made until 50 mg. of lincolnensin hydrochloride and 5 mg. of benzocaine have been deposited on each piece. Thereafter, a second dusting of the hydrogenated castor oil is applied. A final finishing coating is applied of sucrose solution containing flavor and color. Advantageously a polishing coat of wax is added.

The foregoing chewing gum composition is chewed in the mouth to provide the slow release of lincolnensin for the topical treatment of infections of the mouth and throat.

EXAMPLE 15

Suppository, Rectal

One thousand suppositories, each weighing 2.5 gm. and containing 100 mg. of lincolnensin hydrochloride are prepared from the following types and amounts of ingredients:

| | Gm. |
|---|---|
| Lincolnensin hydrochloride | 100 |
| Polymyxin B sulfate (10,000 units/mg.) | 1.25 |
| 6$\alpha$-methylprednisolone | 1 |
| Ethyl aminobenzoate | 75 |
| Zinc oxide | 62.5 |
| Propylene glycol | 162.5 |
| Polyethylene glycol, 4000 q.s. | 2500 |

The lincolnensin hydrochloride, polymyxin B sulfate, 6$\alpha$-methylprednisolone, ethyl aminobenzoate, and zinc oxide are added to the propylene glycol and the mixture milled until the powders are finely divided and uniformly dispersed. The polyethylene glycol 4000 is melted and the propylene glycol dispersion added slowly with stirring. The suspension is poured into unchilled molds at 40° C. The composition is allowed to cool and solidify and then removed from the mold and each suppository foil wrapped.

The foregoing suppositories are inserted rectally for local treatment of inflammation and infection.

13

Alternatively, the foregoing composition can be prepared omitting the steroid.

EXAMPLE 16

Mastitis Ointment

One thousand gm. of an ointment for the treatment of mastitis in dairy cattle is prepared from the following types and amounts of ingredients:

| | Gm. |
|---|---|
| Lincolnensin hydrochloride | 50 |
| Prednisolone acetate | 0.5 |
| Light liquid petrolatum | 300 |
| Chlorobutanol, anhydrous | 5 |
| Polysorbate 80 | 5 |
| 2% aluminum monistearate-peanut oil gel | 400 |
| White petrolatum, q.s. | 1000 |

The lincolnensin hydrochloride and prednisolone acetate are milled with the light liquid petrolatum until finely divided and uniformly dispersed. The chlorobutanol, polysorbate 80, peanut oil gel and white petrolatum are heated to 120° F. to form a melt and the liquid petrolatum dispersion stirred in. With continued stirring the dispersion is allowed to cool (and congeal) to room temperature and is filled into disposable mastitis syringes in 10 gm. doses.

EXAMPLE 17

Animal Feed

One thousand gm. of a feed mix is prepared from the following types and amounts of ingredients:

| | Gm. |
|---|---|
| Lincolnensin hydrochloride | 10 |
| Soybean meal | 400 |
| Fish meal | 400 |
| Wheat germ oil | 50 |
| Sorghum molasses | 140 |

The ingredients are mixed together and pressed into pellets.

The composition can be fed to laboratory animals, i.e., rats, mice, guinea pigs, and rabbits for prophylaxis during shipping.

For larger animals the composition can be added to the animal's regular feed in an amount calculated to give the desired dose of lincolnensin.

EXAMPLE 18

Following the procedure of each of the preceding Examples 1 through 17, each number selected from the group consisting of lincolnensin sulfate, lincolnensin nitrate, lincolnensin phosphate, lincolnensin citrate, lincolnensin lactate, lincolnensin acetate, lincolnensi tartrate, and lincolnensin succinate, is substituted in an equivalent amount for the lincolnensin hydrochloride shown in the example to provide similar therapeutic properties.

14

EXAMPLE 19

Following the procedure of each of the preceding Examples 1 through 4, each member selected from the group consisting of sodium novobiocin, calcium novobiocin, chlortetracycline hydrochloride, oxytetracycline hydrochloride, tetracycline, tetracycline hydrochloride, and tetracycline phosphate complex is added in 50, 100 and 250 gm. amounts to provide a combination having a wider spectrum of therapeutic effectiveness in the treatment of infectious diseases resulting from mixed organisms susceptible to lincolnensin as indicated in the present specification and the above indicated antibiotics as already well known to the medical art.

What is claimed is:

1. A therapeutic composition comprising, in unit dosage form, from about 50 to about 500 mg. of a member selected from the group consisting of lincolnensin and its pharmacologically acceptable acid addition salts as an essential active ingredient in combination with a pharmaceutical carrier.

2. A sterile composition for parenteral administration comprising from about 5% to about 25%, w./v., of a member selected from the group consisting of lincolnensin and its pharmacologically acceptable acid addition salts as an essential active ingredient in combination with a sterile vehicle.

3. The process for treating a bacterial disease in humans and animals which comprises the administering to the bacterial host a therapeutic amount of a member selected from the group consisting of lincolnensin and its pharmacologically acceptable acid addition salts in combination with a pharmaceutical carrier.

4. The process for treating bacterial disease in humans and animals which comprises the administering to the bacterial host, in unit dosage form, from about 50 to about 500 mg. of a member selected from the group consisting of lincolnensin and its pharmacologically acceptable acid addition salts in combination with a pharmaceutical carrier.

5. A process of prophylactic treatment for the prevention of bacterial disease comprising the administering to a disease-susceptible host a member selected from the group consisting of lincolnensin and its pharmacologically acceptable acid addition salts in combination with a pharmaceutical carrier.

6. A process of prophylactic treatment for the prevention of bacterial disease comprising the administering to a disease-susceptible host, in unit dosage form, from about 50 to about 500 mg. of a member selected from the group consisting of lincolnensin and its pharmacologically acceptable acid addition salts in combination with a pharmaceutical carrier.

References Cited in the file of this patent

UNITED STATES PATENTS 3,086,912   Bergy et al. _____ Apr. 23, 1963

UNITED STATES PATENT OFFICE
CERTIFICATE OF CORRECTION

Patent No. 3,155,580  
November 3, 1964

Malcolm E. Bergy et al.

It is hereby certified that error appears in the above numbered patent requiring correction and that the said Letters Patent should read as corrected below.

Column 2, line 30, for "MIC $(p/Ml.)^1$" read -- MIC $(\gamma/Ml.)^1$ --; column 13, line 15, for "monistearate-peanut" read -- monostearate-peanut --; line 54, for "lincolnensi" read -- lincolnensin --.

Signed and sealed this 18th day of May 1965.

(SEAL)  
Attest:

ERNEST W. SWIDER  
Attesting Officer

EDWARD J. BRENNER  
Commissioner of Patents